US006590602B1

(12) United States Patent
Fernandez et al.

(10) Patent No.: US 6,590,602 B1
(45) Date of Patent: *Jul. 8, 2003

(54) DIGITAL TELEVISION WITH SUBSCRIBER CONFERENCE OVERLAY

(75) Inventors: Dennis S. Fernandez, 1175 Osborn Ave., Atherton, CA (US) 94027; Irene Y. Hu, 1240 Avon St., Belmont, CA (US) 94002

(73) Assignees: Dennis S. Fernandez, Atherton, CA (US); Irene Y. Hu, Belmont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 10/026,095

(22) Filed: Dec. 21, 2001

Related U.S. Application Data

(62) Division of application No. 09/095,390, filed on Jun. 10, 1998, now Pat. No. 6,339,842.

(51) Int. Cl.⁷ .................................................. H04N 7/14
(52) U.S. Cl. ................................ 348/14.08; 348/14.11; 725/133
(58) Field of Search ........................... 348/14.01–14.09, 348/14.1, 14.11, 14.12, 14.13, 14.14; 370/260, 261; 379/202.01; 709/204; 725/133, 141, 153

(56) References Cited

U.S. PATENT DOCUMENTS

| 5,689,553 A | * | 11/1997 | Ahuja et al. ........... 379/202.01 |
| 5,913,040 A | * | 6/1999 | Rakavy et al. .............. 709/232 |
| 6,243,129 B1 | * | 6/2001 | Deierling ................. 348/14.08 |
| 6,396,480 B1 | * | 5/2002 | Schindler et al. ........... 345/169 |
| 6,418,214 B1 | * | 7/2002 | Smythe et al. ......... 379/202.01 |

FOREIGN PATENT DOCUMENTS

| JP | 403283982 A | * | 12/1991 | ............ H04N/7/15 |
| JP | 404367040 A | * | 12/1992 | ........... G06F/11/22 |
| JP | 407023356 A | * | 1/1995 | ............ H04N/7/14 |
| JP | 08-130724 | * | 5/1996 | ............ H04N/7/15 |
| JP | 410065984 A | * | 3/1998 | .......... H04N/5/445 |

OTHER PUBLICATIONS

"Battelle Forecast predicts 10 Most Innovative Products for 2006," (www.battelle.org/news/96/96topten.stm) Jan. 29, 1996.
EURESCOM, Management of Multimedia Services, vol. 3: Project P610 Methodologies and case study service selection criteria for management of multimedia services, Feb. 1997.

* cited by examiner

*Primary Examiner*—Melur Ramakrishnaiah
(74) *Attorney, Agent, or Firm*—Fernandez and Associates

(57) ABSTRACT

Digital television system overlays subscriber two-way communication during broadcast program delivery to create virtual audience community. Individual or group billing and advertisement is personalized per DTV receiver program viewing and/or conferencing activity. Subscriber receiver includes camera and other media I/O device for multi-way video conferencing. Participants may be added or removed dynamically during programming or conferencing.

51 Claims, 5 Drawing Sheets

DIGITAL TELEVISION WITH SUBSCRIBER CONFERENCE OVERLAY

RELATED U.S. APPLICATION DATA

This Application is a divisional of U.S. patent application Ser. No. 09/095,390, entitled "DIGITAL TELEVISION WITH SUBSCRIBER CONFERENCE OVERLAY" by FERNANDEZ, et al., filed on Jul. 10, 1998 now U.S. Pat. No. 6,339,842.

FIELD OF INVENTION

The invention relates to digital television systems, particularly to subscriber video conferencing with conventional programming.

BACKGROUND OF INVENTION

Digital television (DTV) attributes have been standardized by industry (e.g., Advanced Television Systems Committee (ATSC) and government (U.S. Federal Communications Commission (FCC)). Such DTV standards, which provide enhanced multimedia quality, as well as interactive data services, are hereby incorporated by reference. Generally, however, DTV specifications contemplate program delivery to various receiver units, but not necessarily communication between receiver units. Accordingly, there may be need for conferencing between units receiving digital system programming.

SUMMARY OF INVENTION

The invention resides in digital television system configured for subscriber conference overlay during program delivery. Billing and advertisement may be personalized according to actual program viewing and/or conferencing activity by DTV receiver. Receiver unit includes media input/output device for multi-user conferencing. Subscribers may be added or removed during programming.

DETAILED DESCRIPTION

Figure 1:
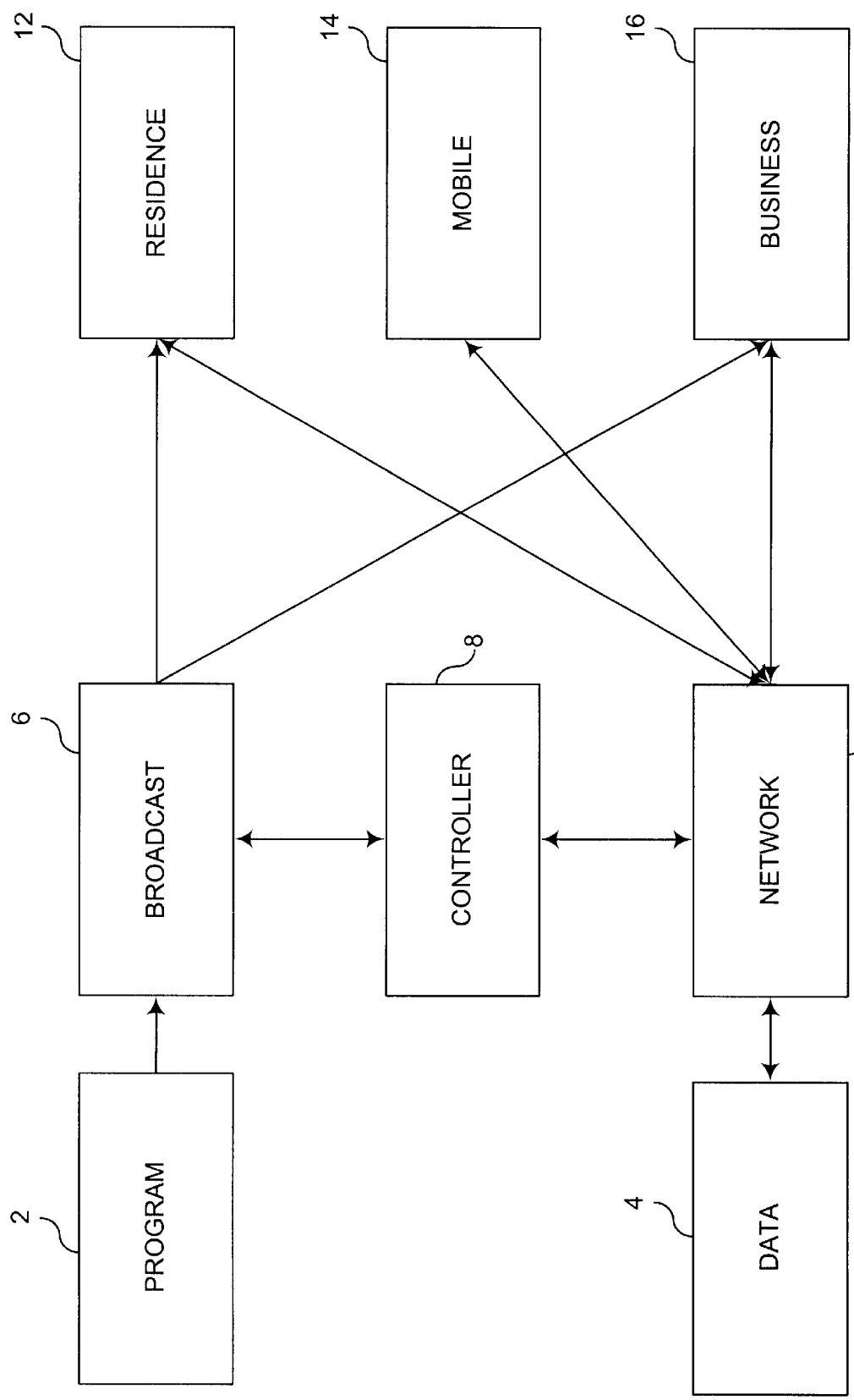
FIG. 1 is block diagram of integrated digital television program and data delivery system for enabling present invention.

FIG. 1 is block diagram of integrated digital television program and data delivery system, including one or more residential 12, mobile 14 and business 16 subscriber, receiver and/or digital television (DTV) units coupled over broadcast 6 and/or network 10 channels respectively to program 2 and/or data 4 sources. Controller 8, which is one or more processor, server, computer or other functionally equivalent controller functionality coupled to broadcast 6 and/or network 10 channel, may affect network 10 and broadcast 6 functionality as described herein.

Program source 2 comprises one or more source for broadcasting one or more video and/or data programs, or other functionally equivalent information signal stream, according to conventional digital and/or analog program broadcasting, accessible or addressable publicly or privately over various broadcast 6 equipment, medium, or other functionally equivalent channels, such as cable, optical fiber, microwave, wireless radio frequency (RF) transmission, direct broadcast satellite (DBS), multichannel multipoint distribution system (MMDS), local multipoint distribution service (LMDS), etc. For example, program 2 may comprise live sports or entertainment performance event, such as professional football game, broadcast over restricted pay-per-view television channels.

Data source 2 comprises one or more source for providing two-way or interactive access to one or more database, file, directory, or other functionally equivalent data repository site or signal source, accessible or addressable publicly or privately over conventional network 10, such as local or wide area network, world-wide web Internet/intranet, or combination thereof, including, for example, network switch, router, bridge, gateway, hub, or other wired and/or wireless networking connection equipment for enabling ISDN, SONET, ATM, frame relay, gigabit Ethernet, TCP/IP, virtual private networks, xDSL, or other similar functionality. Additionally, data 2 may comprise text, graphics, video, or other digital or media information, such as current news update, photographic images, video or audio clips, sports statistics or analysis, stock quotes or financial data, weather forecast report, research data, commercial transaction details, product pricing, etc.

In accordance with important aspect of present invention, digital television system includes multiple receivers coupled selectively or programmably to program 2 and/or data 4 source over broadcast 6 and/or network 10 communications infrastructure, wherein conferencing or communication among DTV subscribers 18 occurs during program and/or data delivery. Consequently, controller 8 may send or transmit service bill indication to participating DTV units per actual program view or conference usage. As used herein, term "conference" or "conferencing" is interpreted broadly and understood to mean any communication between multiple parties.

Additionally, controller may facilitate electronic narrowcast delivery of personalized or customized commercial and/or non-commercial message to select DTV units. Controller 8 and/or subscribers 18 may employ one or more intelligent agents or functionally equivalent software constructs to search, obtain, or transact certain 20 information or activity across network 10. Controller 8 or subscriber unit 18 processor may selectively restrict or censor pre-defined program or data classes or titles, for example, to content screening criteria and/or procedure provided for so-called V-chip specifications. Preferably, each DTV receiver includes searchable and/or identifiable address and various multimedia input/output device capability for enabling video conferencing. Moreover, DTV units may be added or removed during conference period.

Figure 2:
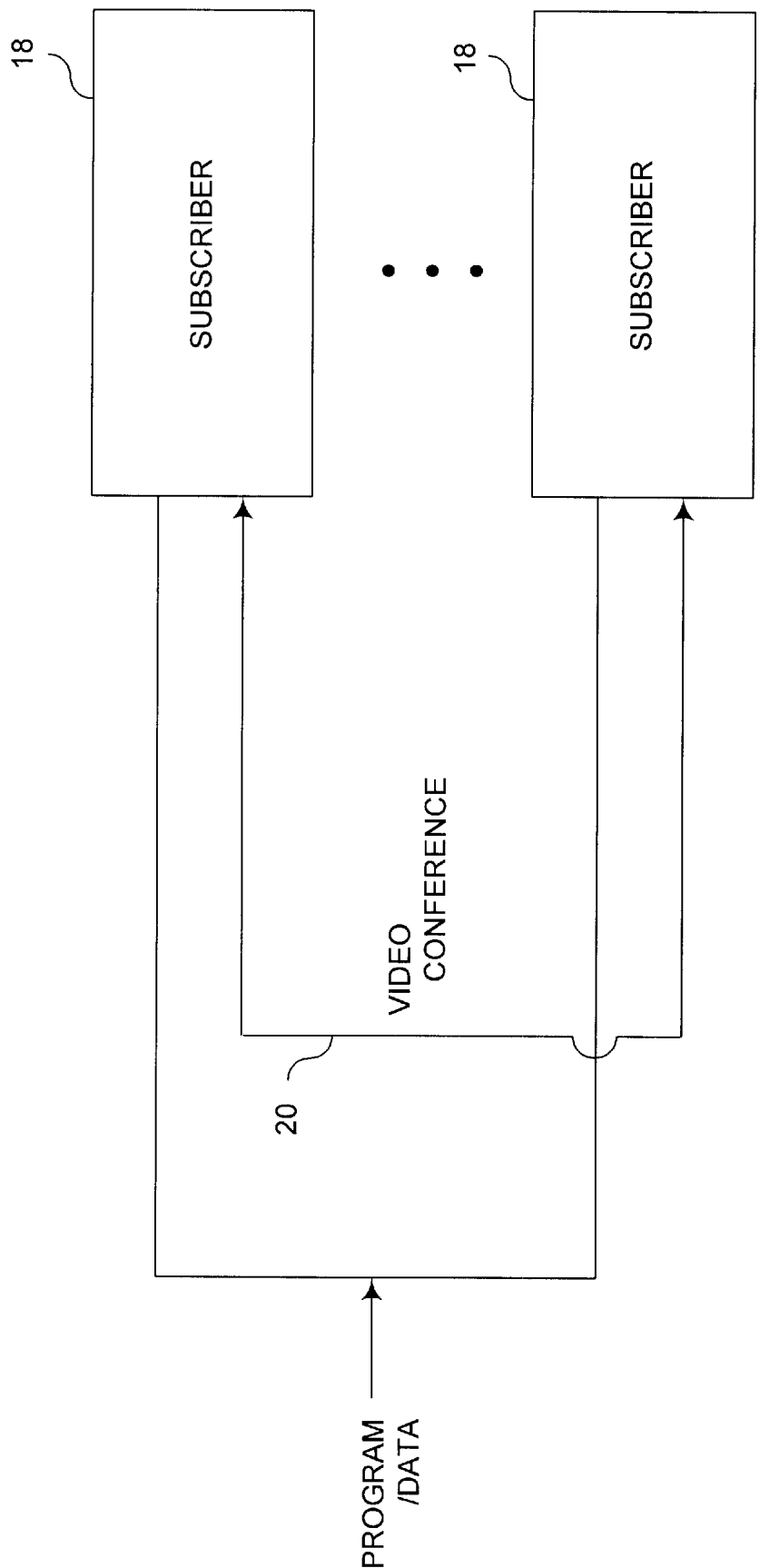
FIG. 2 is simplified diagram of novel overlay of subscriber conferencing over program and/or data delivery.

Accordingly, FIG. 2 shows overlay of subscriber conferencing 20 over program and/or data delivery to subscribers 18. In this networked configuration, controller 8 effectively serves as broadband system headend processor for generating, forwarding, modifying, storing, accessing or otherwise controlling program/data delivery to subscribers 18, while generating, forwarding, modifying, storing, accessing or otherwise controlling video conferencing signal transmission between subscribers 18.

Preferably, such program/data signal generated, transmitted or otherwise processed to receiver units comply with established DTV standards, such as ATSC or other generally accepted industry DTV information or signal format and/or protocol interface, and video conferencing signal generated, transmitted or otherwise processed between receiver units comply with established video conferencing standards, such as H.323, H.324, H.320, T.120 or other generally accepted industry video/data conferencing information or signal format and/or protocol interface, such currently published or online-accessible standards being hereby incorporated by reference.

Figure 3:
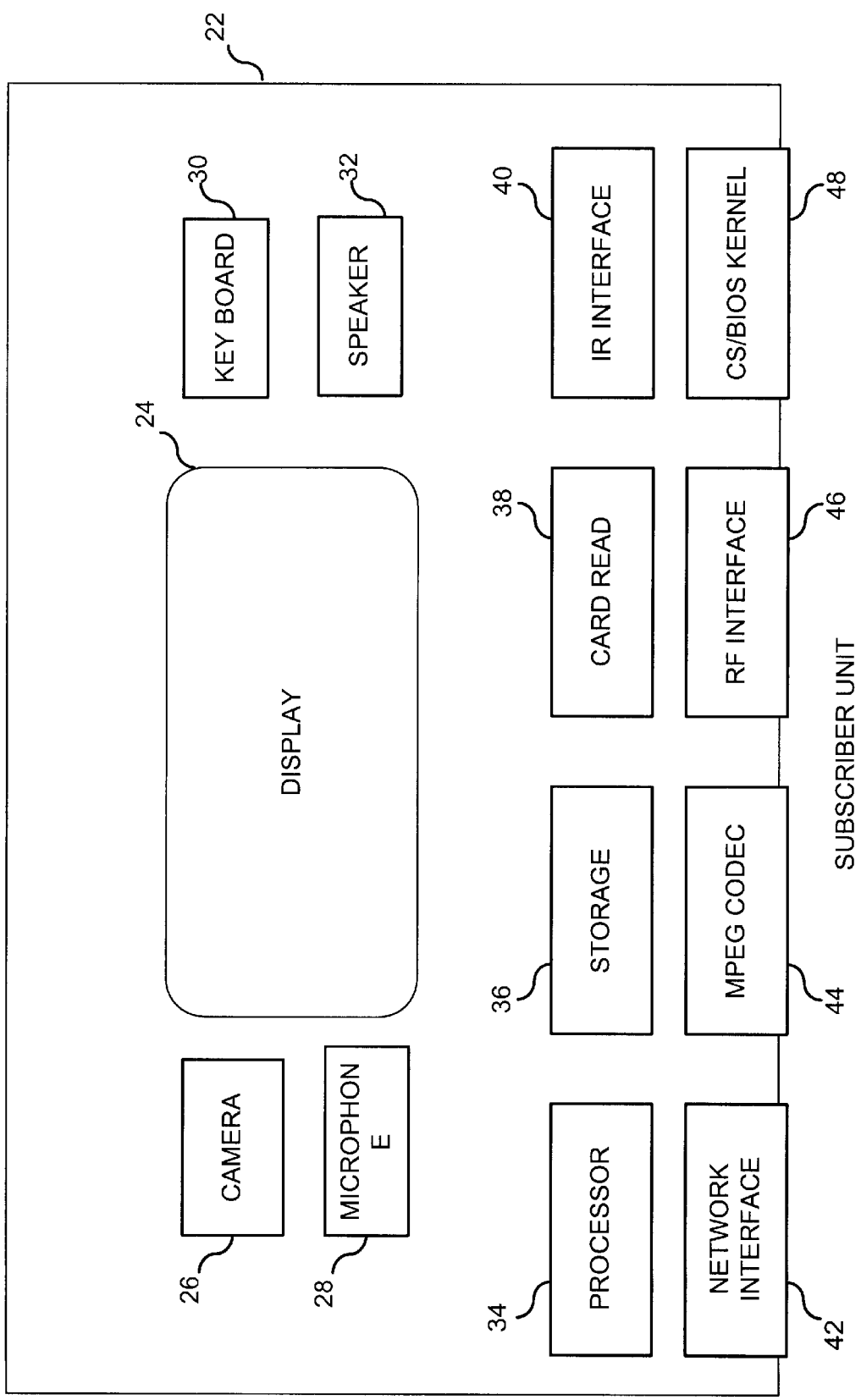
FIG. 3 is representative digital TV subscriber unit used according to present invention.

FIG. 3 shows digital television subscriber unit 22, which may be implemented as one or more DTV receivers 12, 14, or 16 of FIG. 1. Preferably, DTV unit 22, which functions in compliance with Advanced Television Systems Committee (ATSC) standard for DTV equipment and system operation, substantially includes display panel or screen with video frame buffer 24, digital video-conferencing camera or image sensor 26, microphone 28, keyboard and/or mouse 30, speaker(s) 32, processor or controller 34, digital memory or recordable video disk storage 36, peripheral card reader 38, remote control infrared interface 40, network interface or modem 42 (e.g., for coupling to network channel 10), digital compressed video encoder/decoder (i.e., according to Moving Pictures Experts Group (MPEG) industry standards)), radio frequency (RF), broadband or wireless communications interface 46 (e.g., for coupling to broadcast channel 6), and operating system, BIOS, browser, or other associated kernel software 48 for generally enabling system and controller 34 operation and network communications.

It is contemplated that ATSC-compliant DTV unit 22 may be embodied as well in personal or network computer, workstation, set-top television device, or functionally equivalent processing and associated network equipment, as configured to operate as specified herein according to present invention.

Moreover, controllers 8, 34 execute one or more computer programs for performing functions as described herein, preferably according to embedded or real-time software syntax, such as JAVA and/or Windows CE, which currently published or on-line specifications are hereby incorporated by reference.

Figure 4:
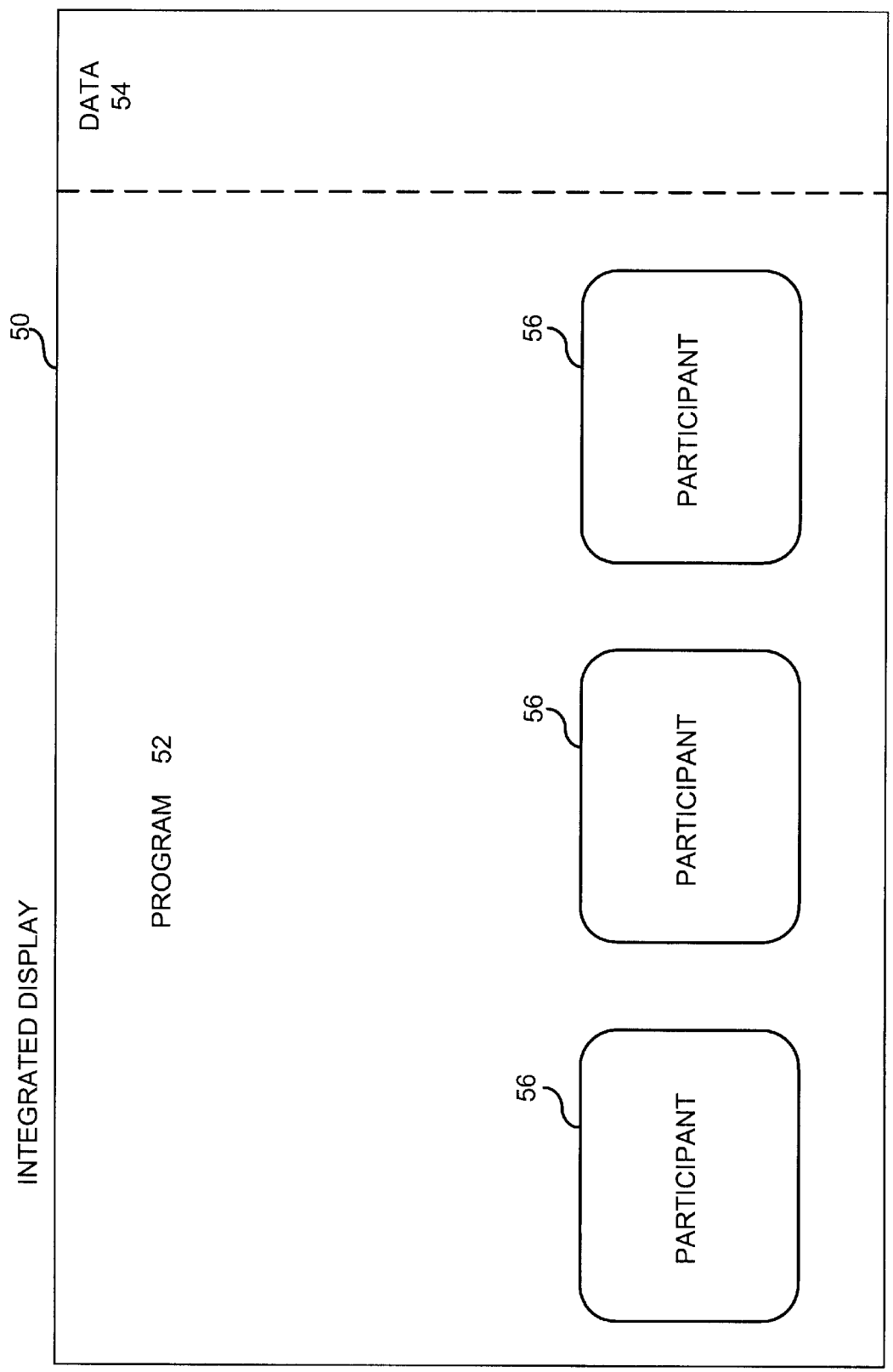
FIG. 4 is sample digital TV display according to present invention.

When DTV unit 22 operates according to present invention, sample display 24 screen output may be as represented in FIG. 4. In particular, display 24 may integrate, combine, mix, or otherwise include program 52 and/or data 54, effectively through video frame buffer, with video conferencing windows from current (i.e., self) and/or other DTV participants 56 coupled thereto, preferably during program/data delivery. For example, each screen element 52, 54, 56 may be shown as picture within or adjacent to another picture element. In this overlaid manner, each DTV unit in select set displays common program and/or data stream, as well as conference video and audio signal output as generated from video camera and microphone from other participant DTV units.

Preferably, such program and/or video signals are compressed and encoded according to industry standard such as MPEG format. Display 50 may also show whiteboard-type screen commonly among participants 56 for jointly communicating text, graphics, or other observable or audible program or data, such as for workgroup or class collaboration to review or discuss draft documents, faxes, or other forms or files.

Figure 5:
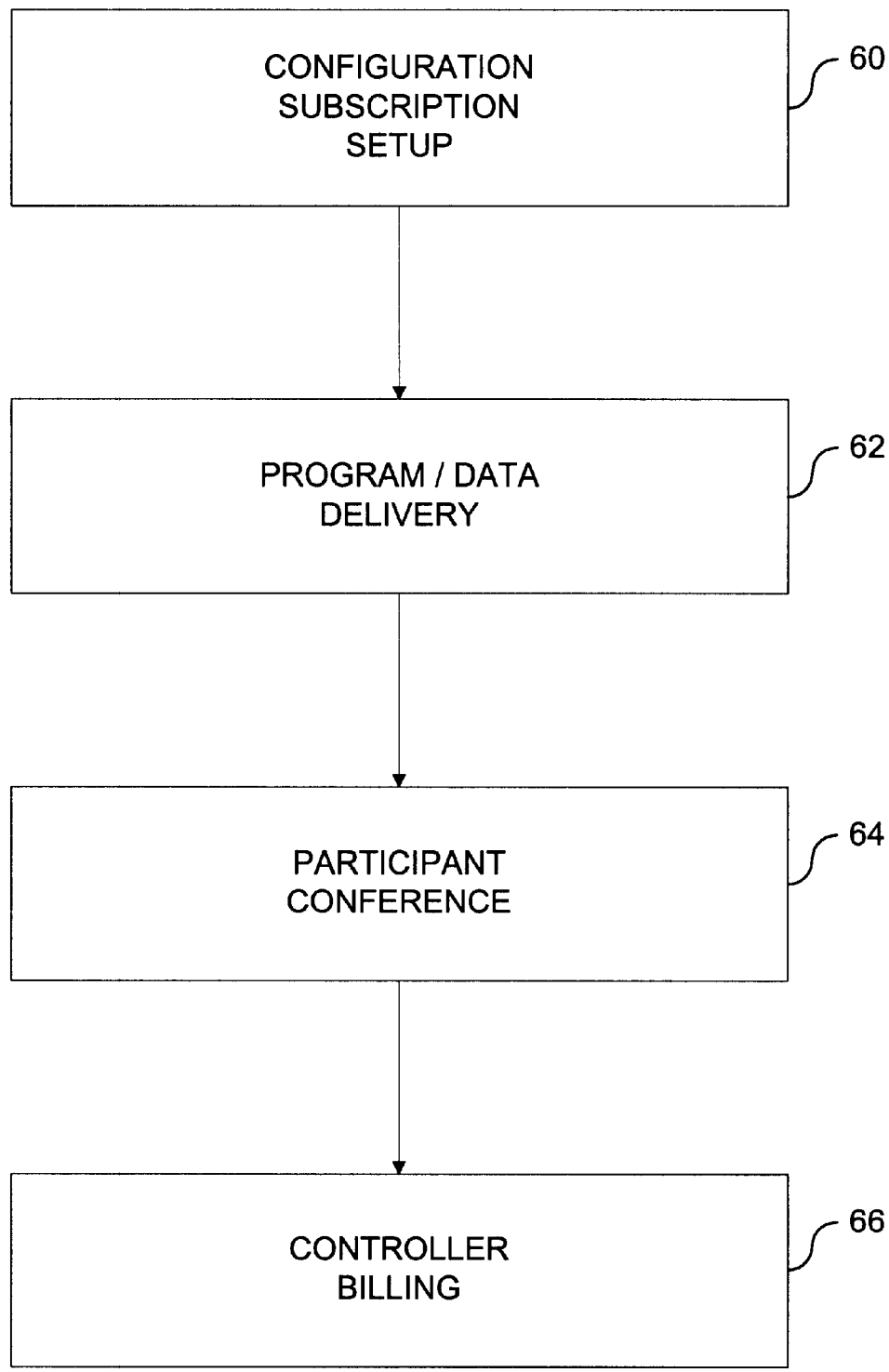
FIG. 5 is flow chart of operational steps of present invention.
Figure 1:
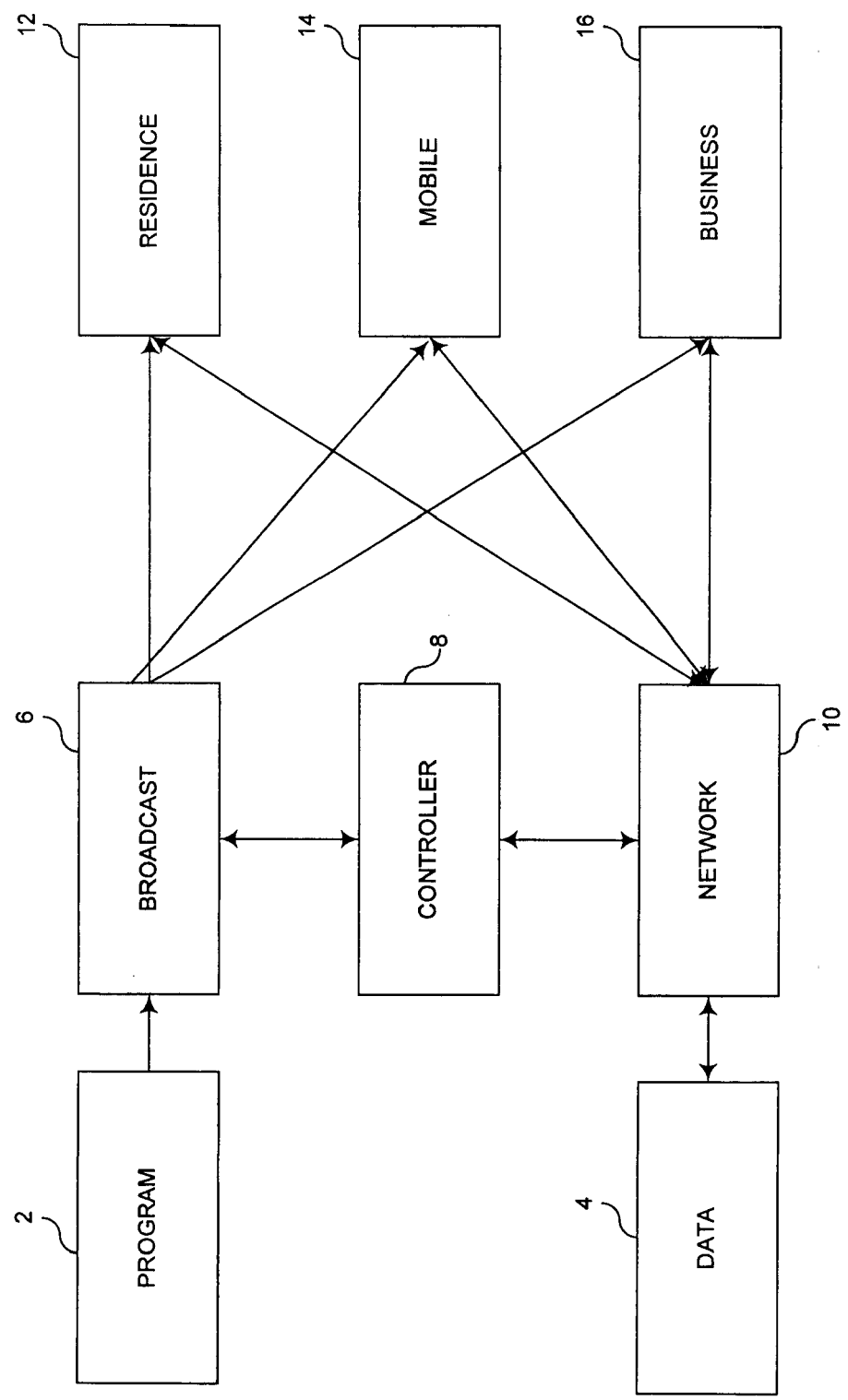
Figure 3:
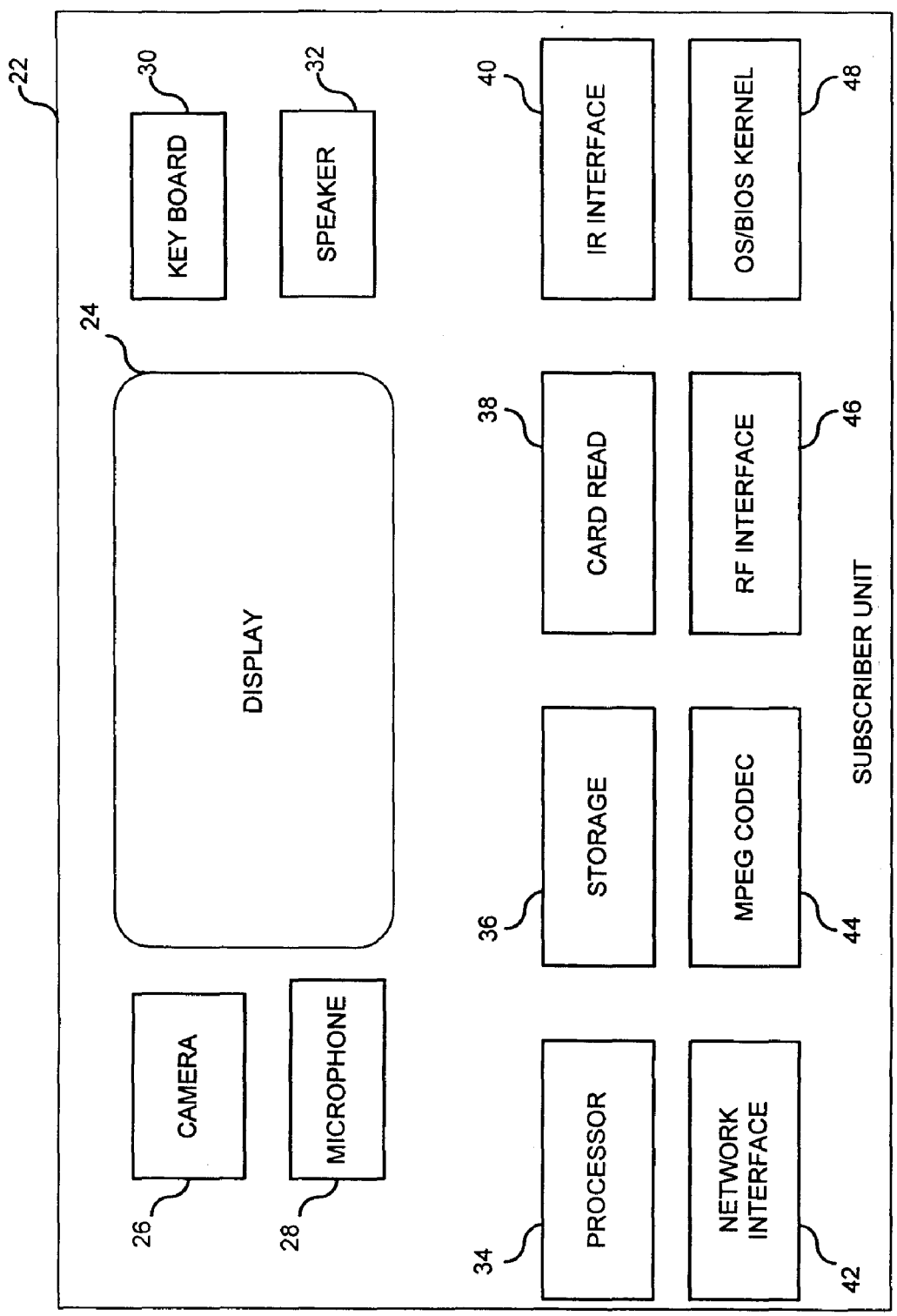

FIG. 5 shows operational flow chart, including steps for system configuration and subscription set-up 60, program and/or data delivery 62, participant conference 64, and controller billing 66. Preferably, controller 8, serves as central processor to coordinate DTV unit set-up, user smart-card account authorization or identity authentication program/data and/or conference scheduling, programming, viewing, output formatting, conference access and communication, billing, advertising, and other associated activity, particularly for managing access to program 2, data 4, as well as DTV video conferencing signals 20. To reduce latency, controller 8 may transmit static image instead of live video.

For example, controller 8 may authorize or cause certain DTV units to be added or removed dynamically from one or more video conferencing active set or selected logical group, as well as restrict select DTV unit(s) from viewing certain program and/or data. Moreover, controller 8 monitors one or more actual program/data viewing and/or conferencing usage for appropriate billing. Furthermore, controller 8 may direct personalized or targeted commercial, incentive, or advertising messages to certain recognized demographic interest group, DTV subscribers or participant video conferencing parties.

Preferably, controller 8 directs such messages dynamically or adaptively according to current subscriber or participant information activity or needs, as well as product availability, market pricing, or other commercial attribute. Additionally, controller 8 may take corrective action or functional adjustment to redirect, restrict, control, or otherwise manage network, program/data, or other system resources, upon detecting actual or possible performance bottlenecks or other equipment or connection fault causing undesirable impact on such information delivery.

In one embodiment of present invention, DTV system is configured for luxury-suite type or other effectively exclusive membership multi-user conferenced viewing of live sports event, such that professional football, basketball, baseball, hockey, soccer, or other competitive individual, team, or tournament telecast is provided as program 2 through broadcast channel 6, including preferably statistical or background data 4 about player, team, or other related game aspect. In particular, controller 8 provides proper access by authorized DTV subscribers 18 to such sports program and/or data. Additionally, controller 8 coordinates or monitors video conferencing activity occurring directly or indirectly between DTV units watching common program/data stream.

Hence, for example, initially, during configuration subscription setup phase 60, system or headend controller 8 begins to identify system configuration, network address, program order and account status of any subscriber units coupled thereto over broadcast 6 and/or network 10 channels. Commercial transaction may occur to define DTV receiver unit user subscriptions, particularly for authenticating, billing, scheduling, notifying, requesting or otherwise providing desired access to any upcoming or current program 2 or database 4. As appropriate, controller 8 may conduct remote diagnostics over such channels to various units 12, 14, 16 to ensure proper functioning for signal delivery.

Next, program and/or data delivery may commence according to controller 8 programmable selection to enable digital transmission for electronic signal delivery 62 of certain program 2 and/or data 4 for presentation in integrated display 50 of selected or addressed DTV subscriber units 18. Then, thereafter, prior, or simultaneously, select participants 56 are enabled for video conferencing 20, particularly by allowing such participants to be monitored by activated video camera 26 and/or microphone 28, for transmission of monitored static image or live motion video compressed encoded digital signal for presentation in display screen 50. Upon completion of program/data delivery and conferencing activity, controller 8 may send proper billing indications to participant DTV units. Controller 8 may appropriately add or delete subscriber 18 in active database.

Therefore, in this combined DTV program/data viewing and select viewer conferencing scheme, important objective of emulating luxury-suite or otherwise more collaborative, intimate or personal conditions among associated audience members located at different locations is achieved effectively.

Optionally, while receiving program/data, conferenced subscriber may also send or receive electronic text message to other subscribers or other mail account addressable through network 10, or run various application programs locally or in distributed client-server networked manner, preferably in common with other conferenced DTV units, such as for multi-user simulation or gaming application.

To improve system program/data broadcast or video conferencing performance, for example, when restricted effectively by channel bandwidth or traffic congestion, controllers 8, 34 may reduce or eliminate actual transmission of full content video signal, and preferably transmit information subset, such as static image, text and/or voice.

Foregoing described embodiments of invention are provided as illustration and description. It is not intended to limit invention to precise form described. Other variations and embodiments are possible in light of above teaching, and it is thus intended that scope of invention not be limited by detailed description, but rather by claims as follow.

We claim:

1. A broadband system headend processor comprising:
   a controller for enabling access simultaneously by a plurality of subscribers to a broadcast program or network data signal; and
   means for monitoring a video conference between such subscribers during such simultaneous access, wherein the controller centrally coordinates the simultaneous access with the video conference by scheduling an active set of subscribers authorized in common to access the broadcast program or network data signal during the video conference, whereby each subscriber authorized by the controller in the active set may receive a billing message for participating simultaneously in the video conference while accessing the same broadcast program or network data signal.

2. The processor of claim 1, wherein:
   the network data signal comprises an electronic whiteboard representation, thereby facilitating collaboration effectively between such subscribers by graphically integrating the video conference and the electronic whiteboard.

3. The processor of claim 1, wherein:
   the network data signal comprises an electronic subscriber message, thereby facilitating narrowcast message delivery effectively to one or more subscriber.

4. The processor of claim 3, wherein:
   the electronic subscriber message is generated by a software search agent.

5. The processor of claim 3, wherein:
   the electronic subscriber message is generated for a current subscriber adaptively according to an activity of the current subscriber.

6. The processor of claim 1, wherein:
   the network data signal comprises a simulation application, thereby enabling an interactive game to be played between such subscribers.

7. The processor of claim 1, wherein:
   the controller restricts access to the broadcast program or network data signal when detecting a broadcast or network delivery condition.

8. The processor of claim 7, wherein:
   the controller restricts such signal access by at least partially reducing transmission of such signal content, thereby effectively improving broadcast or videoconferencing performance by transmitting a signal subset.

9. The processor of claim 1, wherein:
   the monitoring means identifies an address or multimedia capability associated with each subscriber.

10. The processor claim 1, wherein:
    the monitoring means conducts a remote diagnostic of one or more subscriber, thereby ensuring proper subscriber functionality.

11. The processor of claim 1, wherein:
    the monitoring means updates a database representing subscriber participation in the video conference.

12. In an interactive broadcast system comprising a data management system for managing subscriber activity, a database comprising:
    a logical group representing a plurality of subscribers enabled to receive a common program or data, and conduct a videoconference session between such subscribers; and
    a subscriber account associated with each subscriber participating in the videoconference session while receiving a common program or data, thereby facilitating subscriber usage billing, wherein a controller centrally coordinates simultaneous access to the common program or data with the videoconference session by scheduling the logical group of subscribers authorized to access the common program or data during the videoconference session, whereby each subscriber authorized by the controller in the logical group may receive a billing message for participating simultaneously in the videoconference session while accessing the same program or data.

13. The database of claim 12 wherein:
    the subscriber account comprises a subscriber configuration or address.

14. The database of claim 12 wherein:
    the logical group is modifiable to add or delete one or more subscriber respectively for participating or not participating in the videoconference session while receiving the common program or data.

15. In an interactive multi-media device for receiving a broadcast program or network data signal and conferencing with another interactive multi-media device while simultaneously receiving the same broadcast program or network data signal, a method for graphically integrating a conference and program comprising the steps of:
    displaying in a display screen a broadcast program or data signal; and
    overlaying graphically in the display screen one or more screen elements representing conference participants receiving the same broadcast program or data signal, wherein a controller centrally coordinates simultaneous access by the conference participants by scheduling an active set of conference participants authorized in common to access the broadcast program or data signal during the conference, whereby each conference participant authorized by the controller in the active set may receive a billing message for participating simultaneously in the conference while accessing the same broadcast program or data signal.

16. The method of claim 15 wherein:

the broadcast program comprises a live sports event, each conference participant being located simultaneously at different program viewing locations.

17. A set-top device for coupling to a video screen and a camera, the device comprising:

a processor, and an interface;

wherein the processor enables a videoconference by a subscriber using the camera simultaneously with delivery of a program through the interface effectively to the subscriber; the video screen thereby displaying an integrated image of the video conferencing subscriber and the delivered program, wherein a controller centrally coordinates simultaneous access with the videoconference by scheduling an active set of video conferencing subscribers authorized in common to access the program during the video conference, whereby each subscriber authorized by the controller in the active set may receive a billing message for participating simultaneously in the video conference while accessing the same program.

18. The device of claim 17 wherein:

the interface couples to a program source for broadcasting an analog video signal over a cable channel.

19. The device of claim 17 wherein:

the interface couples to a program source for broadcasting a digital video signal over a satellite channel.

20. The device of claim 17 further comprising:

a digital memory for recording the delivered program for subsequently scheduled viewing thereof, the processor authenticating subscriber access to view the recorded program.

21. The device of claim 17 wherein:

the interface couples to a data source for providing a game application over a network channel, the program comprising the game application, the processor executing the application interactively with the subscriber.

22. The device of claim 17 wherein:

the program comprises an electronic whiteboard representation, thereby facilitating collaboration effectively with the subscriber by graphically integrating the video conference and the electronic whiteboard.

23. The device of claim 17 wherein:

the program comprises an electronic subscriber message, thereby facilitating narrowcast message delivery effectively to the subscriber.

24. The device of claim 23 wherein:

the electronic subscriber message is generated by a software search agent.

25. The device of claim 23 wherein:

the electronic subscriber message is generated for a current subscriber adaptively according to an activity of the current subscriber.

26. The device of claim 17 wherein:

the program comprises a simulation application, thereby enabling an interactive game to be played with the subscriber.

27. The device of claim 17 wherein:

the processor restricts access to the program when detecting a broadcast or network delivery condition.

28. The device of claim 27 wherein:

the processor restricts such signal access by at least partially reducing transmission of the program, thereby effectively improving broadcast or video-conferencing performance by transmitting a signal subset.

29. The device of claim 17 wherein:

the processor identifies an address or multimedia capability associated with the subscriber.

30. The device claim 17 wherein:

the processor conducts a remote diagnostic for the subscriber, thereby ensuring proper subscriber functionality.

31. The device of claim 17 wherein:

the processor updates a database representing subscriber participation in the video conference.

32. The device of claim 31 wherein the database comprises:

a logical group representing a plurality of subscribers enabled to receive a common program or data, and conduct a videoconference session between such subscribers; and a subscriber account associated with each subscriber participating in the videoconference session while receiving a common program or data, thereby facilitating subscriber usage billing.

33. The device of claim 32 wherein:

the subscriber account comprises a subscriber configuration or address.

34. The device of claim 32 wherein:

the logical group is modifiable to add or delete one or more subscriber respectively for participating or not participating in the videoconference session while receiving the common program or data.

35. Broadcast method comprising of:

coupling a program source and a data source; and broadcasting a signal comprising a common program from the program source and a videoconference between a plurality of participants from the data source, whereby the broadcast signal enables a plurality of receivers to display an integrated image of the common program and each videoconference participant, wherein a controller centrally coordinates simultaneous access to the common program and the videoconference by scheduling an active set of participants authorized in common to access the common program during the video conference, whereby each participant authorized by the controller in the active set may receive a billing message for participating simultaneously in the video conference while accessing the same program.

36. The method of claim 35 wherein:

the common program comprises a live sports event, each videoconference participant being located simultaneously at different program viewing locations.

37. The method of claim 35 wherein:

the signal comprises an analog video signal for broadcast over a cable channel.

38. The method of claim 35 wherein:

the signal comprises a digital video signal for broadcast over a satellite channel.

39. The method of claim 35 wherein:

the common program comprises an electronic whiteboard representation, thereby facilitating collaboration effectively between a plurality of video conference participants by graphically integrating the video conference and the electronic whiteboard.

40. The method of claim 35 wherein:

the common program comprises an electronic subscriber message, thereby facilitating narrowcast message delivery effectively to one or more receivers.

41. The method of claim 40 wherein:

the electronic subscriber message is generated by a software search agent.

42. The method of claim 40 wherein:

the electronic subscriber message is generated for a current subscriber adaptively according to an activity of the current subscriber.

43. The method of claim 35 wherein:

the common program comprises a simulation application, thereby enabling an interactive game to be played by one or more video conference participant.

44. The method of claim 35 wherein:

access to the common program is restricted when a broadcast or network delivery condition is detected.

45. The method of claim 44 wherein:

such access is restricted by at least partially reducing transmission of the program, thereby effectively improving broadcast or video-conferencing performance by transmitting a signal subset.

46. The method of claim 35 further comprising the step of:

identifying an address or multimedia capability associated with one or more receiver.

47. The method of claim 35 further comprising the step of:

conducting a remote diagnostic for one or more receiver, thereby ensuring proper receiver functionality.

48. The method of claim 35 further comprising the step of:

updating a database representing subscriber participation in the video conference.

49. The method of claim 48 wherein the database comprises:

a logical group representing a plurality of receivers enabled to receive a common program or data, and conduct a videoconference session between such receivers; and an account associated with each receiver participating in the videoconference session while receiving a common program, thereby facilitating receiver usage billing.

50. The method of claim 49 wherein:

the account comprises a receiver configuration or address.

51. The method of claim 49 wherein:

the logical group is modifiable to add or delete one or more receiver respectively for participating or not participating in the videoconference while receiving the common program.

* * * * *

UNITED STATES PATENT AND TRADEMARK OFFICE
CERTIFICATE OF CORRECTION

PATENT NO. : 6,590,602 B1
DATED : July 8, 2003
INVENTOR(S) : Fernandez et al.

It is certified that error appears in the above-identified patent and that said Letters Patent is hereby corrected as shown below:

<u>Title page,</u>
Item [62], Related U.S. Application Data, the filed date of the related U.S. Application is -- Jun. 10, 1998 -- instead of "Jul. 10, 1998."

<u>Column 1,</u>
Line 9, delete "Jul." and insert -- Jun. --

Signed and Sealed this

Ninth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,590,602 B1
DATED : July 8, 2003
INVENTOR(S) : Fernandez et al.

It is certified that error appears in the above-identified patent and that said Letters Patent is hereby corrected as shown below:

Drawings,
Fig. 1, please insert an arrow pointing from Broadcast 6 to Mobile 14 (as shown on attached page).
Fig. 3, CS/BIOS KERNEL 48, please delete "CS/BIOS KERNEL", and insert -- OS/BIOS KERNEL -- (as shown on attached page).

Column 2,
Lines 13 and 24, please delete "2", and insert -- 4 --.

Signed and Sealed this

Twenty-seventh Day of September, 2005

JON W. DUDAS
*Director of the United States Patent and Trademark Office*